United States Patent
Zaitsev

(10) Patent No.: US 8,978,142 B2
(45) Date of Patent: *Mar. 10, 2015

(54) SYSTEM AND METHOD FOR DETECTION OF MALWARE USING BEHAVIOR MODEL SCRIPTS OF SECURITY RATING RULES

(71) Applicant: Kaspersky Lab ZAO, Moscow (RU)

(72) Inventor: Oleg V. Zaitsev, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 14/077,688

(22) Filed: Nov. 12, 2013

(65) Prior Publication Data

US 2014/0181897 A1   Jun. 26, 2014

Related U.S. Application Data

(63) Continuation of application No. 13/844,080, filed on Mar. 15, 2013, now Pat. No. 8,607,349.

(30) Foreign Application Priority Data

Dec. 25, 2012   (RU) ................... 2012156446

(51) Int. Cl.
  *G06F 21/00* (2013.01)
  *H04L 29/06* (2006.01)
  *G06F 21/56* (2013.01)

(52) U.S. Cl.
  CPC ............ *H04L 63/145* (2013.01); *G06F 21/566* (2013.01)
  USPC .......................................... 726/24

(58) Field of Classification Search
  CPC ..... H04L 63/20; H04L 63/145; G06F 21/577; G06F 11/3409; G06F 21/56
  USPC ......... 713/152, 164–165, 187–188; 726/1–36
  See application file for complete search history.

(56) References Cited

U.S. PATENT DOCUMENTS

| | | |
|---|---|---|
| 6,006,329 A | 12/1999 | Chi |
| 7,530,106 B1 | 5/2009 | Zaitsev et al. |
| 7,640,589 B1 | 12/2009 | Mashevsky et al. |
| 8,001,606 B1 | 8/2011 | Spertus |
| 8,087,086 B1 | 12/2011 | Lai et al. |
| 8,239,944 B1 | 8/2012 | Nachenberg et al. |
| 8,302,191 B1 | 10/2012 | Conrad et al. |
| 2005/0188272 A1 | 8/2005 | Bodorin et al. |
| 2007/0180528 A1 | 8/2007 | Kane |

(Continued)

*Primary Examiner* — Jeffery Williams
*Assistant Examiner* — Christopher C Harris
(74) *Attorney, Agent, or Firm* — Arent Fox LLP; Michael Fainberg

(57) ABSTRACT

Disclosed are systems, methods and computer program products for detecting computer malware using security rating rules. In one example, the system identifies at least one problematic security rating rule that was activated during antivirus analysis of both safe and malicious programs. The system then selects a group of programs for which said problematic rule was activated. The system then identifies in the selected group of programs a plurality of only malicious programs or the plurality of only safe programs based on the problematic security rating rule and at least one different security rating rule. The system then generates a behavior model script based on the problematic security rating rule and the at least one different security rating rule and executes said behavior model script during antivirus analysis of said analyzed program to detect a computer malware in said analyzed program.

20 Claims, 3 Drawing Sheets

(56) References Cited

U.S. PATENT DOCUMENTS

| | | |
|---|---|---|
| 2009/0328221 A1 | 12/2009 | Blumfield et al. |
| 2010/0083376 A1 | 4/2010 | Pereira et al. |
| 2010/0100963 A1 | 4/2010 | Mahaffey |
| 2010/0180344 A1 | 7/2010 | Malyshev et al. |
| 2011/0173698 A1 | 7/2011 | Polyakov et al. |
| 2012/0260342 A1 | 10/2012 | Dube et al. |
| 2012/0266208 A1 | 10/2012 | Morris et al. |
| 2012/0324579 A1 | 12/2012 | Jarrett et al. |

SYSTEM AND METHOD FOR DETECTION OF MALWARE USING BEHAVIOR MODEL SCRIPTS OF SECURITY RATING RULES

CROSS-REFERENCE TO RELATED APPLICATIONS

This application is a continuation of U.S. application Ser. No. 13/844,080 filed on Mar. 15, 2013, which claims benefit of priority under 35 U.S.C. 119(a)-(d) to a Russian Application No 2012156446 filed on Dec. 25, 2012, both of which are incorporated by reference herein.

TECHNICAL FIELD

The present disclosure generally relates to the field of computer security, and specifically to systems, methods and computer program products for detecting computer malware using behavior model scripts of security rating rules.

BACKGROUND

The rapid growth of computer technology and computer networks has been accompanied by an increase in the problems of providing protection against malicious objects which enter users' computers in the form of malicious programs, viruses, worms, undesirable applications and other types of malware. Many antivirus technologies are used at the present time, including signature and heuristic analysis, emulation and proactive protection.

The commonly owned U.S. Pat. No 7,530,106, which is incorporated by reference herein, discloses an antivirus technology that uses security rating rules for evaluating behavior of executable files in order to detect malicious behaviors therein. These security rating rules are formulated based on the study of behavior of known malicious programs. Each rule has a specified structure, as follows: rule identifier, name of the API function called (an API, or Application Programming interface, which is a set of prepared classes, functions, structures and constants provided by the operating system for use by external programs), API function's arguments, and security rating. The rule is activated to classify a tested file as malicious when a thread of execution of process started from that file calls one or more API functions with arguments specified by the rule, in which case the security rating of the file will be increased by the value specified in the rule.

However, the patented system has a number of shortcomings due to the frequently changing behaviors of malicious programs. Security rating rules of this kind may fail to trace a chain of events such as "downloading a file", "storing a file on disk" and "setting autostart", since each event of this type may not have a sufficiently high security rating or may have no security rating at all. This, in turn, means that an unknown malicious program which has performed these actions will not be blocked at the appropriate time. Moreover, the proposed system does not keep a count of the number of activations of the specified rules, the order of the activation of a series of rules, and the like. A system of this kind also has shortcomings associated with the appearance of errors of a first kind (false positives) and a second kind (false negatives). Accordingly, there is a need for a malware detection mechanism that overcomes the shortcoming of the prior antivirus technologies.

SUMMARY

Disclosed are systems, methods and computer program products for detecting computer malware using security rating rules. In one example, the system identifies at least one problematic security rating rule that was activated during antivirus analysis of both safe and malicious programs. The system then selects a group of programs for which said problematic rule was activated. The system then identifies in the selected group of programs a plurality of only malicious programs or the plurality of only safe programs based on the problematic security rating rule and at least one different security rating rule. The system then generates a behavior model script based on the problematic security rating rule and the at least one different security rating rule and executes said behavior model script during antivirus analysis of said analyzed program to detect a computer malware in said analyzed program.

The above simplified summary of example embodiment(s) serves to provide a basic understanding of the invention. This summary is not an extensive overview of all contemplated aspects of the invention, and is intended to neither identify key or critical elements of all embodiments nor delineate the scope of any or all embodiments. Its sole purpose is to present one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description, serve to explain their principles and implementations.

DETAILED DESCRIPTION OF EXAMPLE EMBODIMENTS

Figure 1:
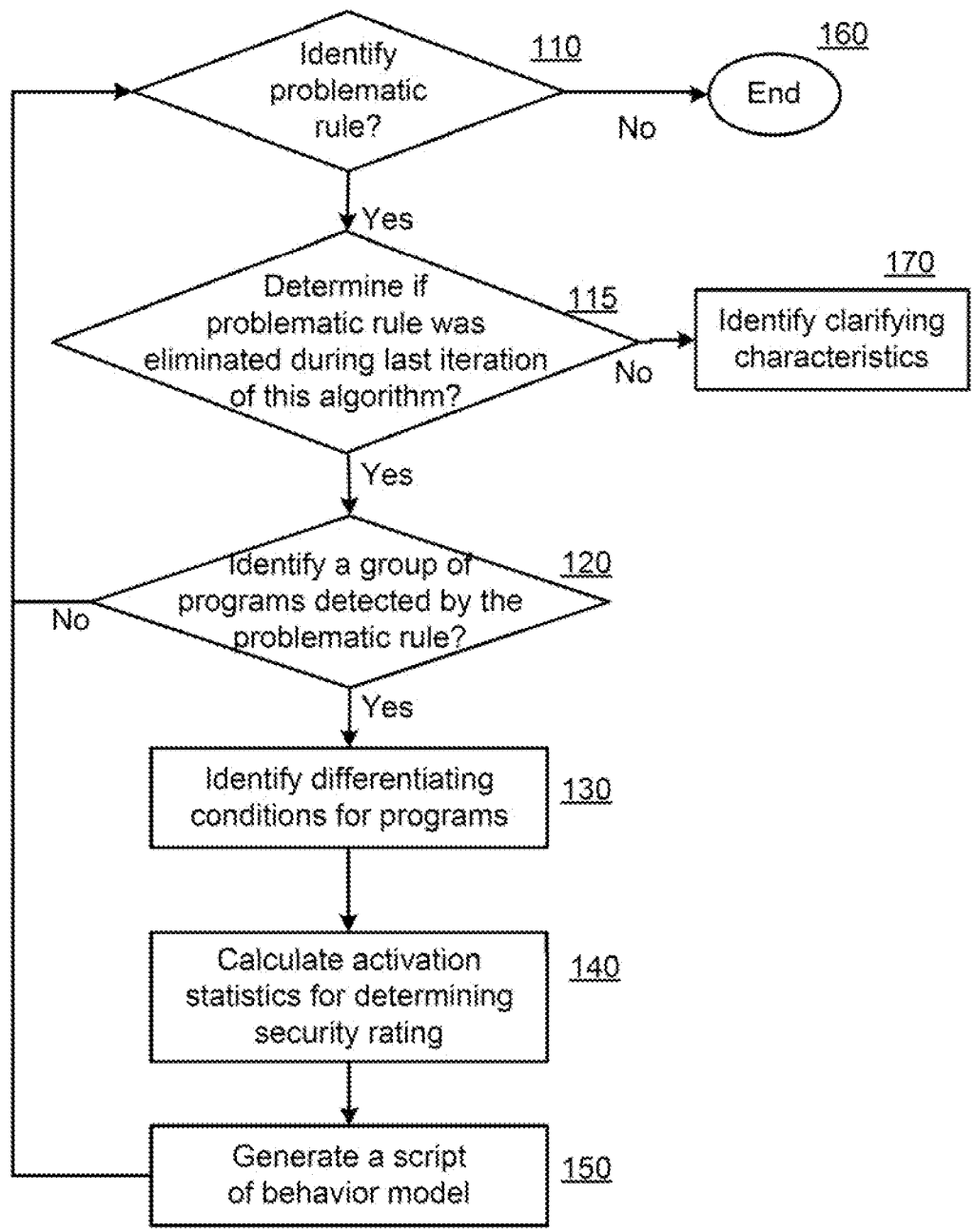
FIG. 1 illustrates an example method for generating a behavior model script of security rating rules.

Example embodiments of the present invention are described herein in the context of systems, methods and computer program products for detection of malware using behavior model scripts of security rating rules. The example embodiments of systems, methods and computer program produces can be used in various devices which contain file systems such as personal computers, notebook computers, tablets, smart phones, network servers and the like. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

In one aspect, the malware detection mechanisms disclosed herein are the improvements on the antivirus system disclosed in the described U.S. Pat. No. 7,530,106 that uses security rating rules for evaluating executable files in order to detect malicious software therein. An example structure of a security rating rule may be as follows:

Rule "loading a driver through a low level API ntdll.dll":
Rule identifier: 83
API function: Loading a driver (NtLoadDriver)
Condition for argument 1: *
Condition for argument 2: *
Condition for arguments 3 . . . N: *
Rating: single operation—40%, 2-3 operations—50%, >3 operations—60%
Based on this rule, can the process be regarded as malware? No In one aspect, the security rating R (also referred as SR) varies from 'safe' to 'dangerous' (high) and calculated from 0 to 100 percent, where 0% is the safest level and 100% is the most dangerous level. For example, process may be rated as 'safe' with a rating of 0-25%, a process rated as 'moderately dangerous' or 'suspicious' with a rating of 25-75% and in excess of 75% the process is rated as 'dangerous' (high). As will be appreciated, these numbers are exemplary and subject to change based, for example, on specific system requirements.

Since the rules of this type are activated independently of each other, the approach proposed in the aforesaid patent suffers from a number of drawbacks. For example, it is hard to trace a chain of related events; no count is made of the number of activations of the specified rules; there is no procedure for the activation of a number of rules; and, furthermore, there is no mechanism for preventing most common errors: false positive errors (hereinafter the first kind of errors) and false negative errors (hereinafter the second kind of errors).

These drawbacks will be examined in a number of examples. Table 1 below illustrates example statistics on activation of rules during analysis of malicious and safe files:

| Type/<br>MD5 ID | Statistics | Rule<br>#51 | Rule<br>#127 | Rule<br>#214 | Rule<br>#278 | Rule<br>#305 | Rule<br>#346 | Rule<br>#401 |
|---|---|---|---|---|---|---|---|---|
| malicious<br>MD5 ID1 | 5 | + | + | | + | | + | |
| malicious<br>MD5 ID2 | 19 | + | | | + | | + | |
| malicious<br>MD5 ID3 | 150 | + | + | | | | + | |
| safe<br>MD5 ID4 | 40 | + | + | + | | | | |
| safe<br>MD5 ID5 | 90 | + | + | | | + | + | + |
| safe<br>MD5 ID6 | 55 | + | + | + | | + | + | + |

More specifically, Table 1 shows an example of the statistics on the activation of the rules for six programs (the program type and the MD5 sum of the executable file are shown). The "statistics" column shows the number of computers on which the presence of the specified executable file was detected. The columns for the individual rules contain records ("+") of the activation of each security rating rule, each of these columns being capable of showing the number of activations of the security rating rule during the analysis of the corresponding executable file.

It can be seen from the table above that some rules are activated only on safe programs (e.g., rules 214, 305, 401). Other rules are activated on malicious programs only (rule 278). These rules can clearly identify clean or malicious programs. However, a number of rules are activated on both malicious and safe programs (e.g., rules 51, 127 and 346). The rules that are activated on both on clean and malicious problems are problematic because they may cause false positive and false negative errors during detection of clean or malicious programs.

In one aspect, one approach to eliminating possible false positive errors caused by the erroneous classification of safe programs as malicious is to lower the security ratings of safe programs when a specific set of rules is activated. For example, when rules 51, 127 and 214 are activated to classify a program as malicious, the security rating of this program may be lowered below maliciousness threshold (e.g., decrease total SR below 75%), since the program is known to be safe by virtue of activation of rule 214, which is known to activate on safe programs only. In another aspect, a similar approach may be taken when a malicious program executes a number of actions whose total security rating does not warrant the blocking of the program as potentially malicious (for example, in case of the simultaneous activation of rules 51 and 127 and non-activation of any of rules 214, 305 and 401). Therefore, in these cases, the total security rating for the malicious program may be increased above the maliciousness threshold.

Accordingly, in one example embodiment, an antivirus system (e.g., an application deployed on a personal computer or network server) can identify problematic security rating rules and automatically create behavior model scripts for such security rating rules based on the analysis of the activation of different security rating rules for both malicious and safe programs.

Example 1 of an automatically created behavior model script:

```
Begin
 if (RuleStat(51)>0 and
  (RuleStat(127)>0) or RuleStat (346)>0) then begin
   If (RuleStat(214)>0) then
    AddSR(-20);
   If (RuleStat(214)>0 and RuleStat(305)>0 and RuleStat(401)>0) then
    AddSR(-80);
   If (RuleStat(214)=0 and RuleStat(305)=0 and RuleStat(401)=0) then
    AddSR(+30);
  end;
 if (RuleStat(51)>0 and RuleStat(346)>0 then
  if (RuleStat(214)=0 and RuleStat(305)=0 and RuleStat(401)=0 then
   AddSR(+25);
end.
```

In the example script above, RuleStat is a function that receives the rule identifier as an input argument and returns the number of activations of that rule. The function AddSR changes the current value of the security rating by the number received as its input argument. In one aspect, the argument of the function AddSR is calculated proportionally by comparing the values of the "statistics" column for the malicious and safe programs. The function AddSR may be called more than once during the calculation of the security rating of the program being examined, and the correction may be applied either as an increase or a reduction of the rating. As a general rule, when the function AddSR is called, the argument used does not have to be a constant, but can be any arithmetical expression reflecting the dependence of the correction coefficient on factors such as the frequency of activation of one or other of the rules.

FIG. 1 shows an example method of generating by the antivirus system a behavior model script, such as script in Example 1. In step 110, the system identifies one or more problematic security rating rules when a rule is activated simultaneously on both malicious and safe programs. In Example 1, rule 51 is an example of a problematic rule. In step 115, the fact of the elimination of a problematic rule that was found in a previous iteration of the algorithm is determined. If it has been impossible to create a behavior model script for the rule in question, the method moves to step 170. Otherwise, and also on the first iteration of the elimination of the problematic rule, a group of programs (both malicious and safe) for which this rule is activated is selected in step 120. The process of differentiating programs starts in step 130, this process consisting of a search for any other rule (or rules) which enable only malicious or only safe programs to be identified from the selected group of programs. In one aspect, the differentiation process may have an increasing level of complexity, e.g., as follows:

```
if (RuleStat(X)>0 and/or RuleStat(Y)>0) then
    if (RuleStat(X)>0 and/or RuleStat(Y)>0 and/or RuleStat(Z)>0) then
        if (RuleStat(X)>0 and/or RuleStat(Y)>0 and/or RuleStat(Z)>0 and/
or RuleStat(K)>0) then
        ...
``` where X, Y, Z, K are the identifiers of rules. Thus, if a group composed of exclusively malicious or exclusively safe programs cannot be selected by analyzing the activation of only two rules, the condition becomes more complex, with the addition of a third rule, and so on. Furthermore, the conditions may be of both the logical AND type and the logical OR type. The differentiation process may continue until all the rules and available logical conditions have been applied. During the differentiation process, a threshold may also be automatically formulated; for example, the condition may appear as "RuleStat(Y)>3", so as to take into account not only the fact that rule Y has been activated, but also the number of activations.

After the differentiating conditions have been identified in step 130, the activation statistics are calculated in step 140. The logic of the rating calculation may be based on a simple condition, namely that false positives for safe programs are to be avoided, while malicious programs must still be detected. For example, if a malicious program is given a security rating of only 57% under the system of rules, and if there is a condition that the threshold of maliciousness is 80%, then the rating addition function may add at least 24% (i.e. it will appear as AddSR(+24)). A similar approach is taken to safe programs: for example, if a safe program is given a security rating of 91%, then it may be reduced by at least 11%. Depending on the rule activation statistics, such values may be increased or decreased. The statistics also have an effect on the thresholds for the determination of the maliciousness of programs. For example, if the statistics show that many safe programs are erroneously detected as malicious because of a low maliciousness threshold, then the threshold in question may be raised, provided that this does not affect the quality of detection of known malicious programs.

Next in step 150, the antivirus system may generate a behavior model script for the problematic security rating rules, similar to the script shown in Example 1. This is followed by a return to step 110, in which other problematic rules are identified. It should also be noted that, during the generation of the behavior model script for problematic security rating rules, the analysis may exclude any programs which have been unambiguously identified by previously created behavior model scripts (that is to say, malicious programs for which an additional security rating has already been assigned, or safe programs for which a reduction rating has been assigned). The checking in step 120 for the determination of both safe and malicious programs for which a problematic rule is activated takes place in a similar way. Once the behavior model script is generated at step 150, the script may be executed during antivirus analysis of computer programs to detect malware in the analyzed programs.

It should be noted that it is not always possible to create a behavior model script automatically for problematic security rating rules. FIG. 1 expresses this in the form of step 170 in which further clarifying characteristics are identified when the system cannot eliminate a problematic rule by creating a behavior model script in step 115. Several examples illustrating the addition of clarifying characteristics to the behavior model script are described next.

The following example illustrates the complexity of the classification of safe and malicious programs in an example concerning the installation of an instant messaging (IM) program. Some modern IM programs support operation with a number of IM protocols, such as ICQ, Skype and the like. Because of this, during the installation process the IM program asks the user if he wishes to import credentials and messaging history from other installed IM programs. Let us assume that the user is installing an IM program for the first time, and that the aforesaid ICQ and Skype services operate in this program. During installation, the IM program installer checks for the presence of IM program installed previously on the user's computer. For this purpose, the programs installer checks a list of installed applications or attempts to obtain access to files with configurations of the corresponding instant IM program. Automatically repeated attempts to access the configurations of various IM programs are characteristic of Trojans, which use the same credentials (user name and password) for theft from a user's computer. However, in order to store these credentials, as well as the network configuration parameters and the server configuration parameters for access to IM services, a configuration storage file is created, which is characteristic of the instant IM program. The operation of creating a configuration file is a characteristic distinctive characteristic (i.e., clarifying characteristics) of the behavior of a safe program (executable file). This enables a new behavior model script to be created automatically, this script prevents a false positive during the analysis of the behavior of the program installer of the client of the IM service.

Example 2 illustrates of a behavior model script with clarifying characteristics:

```
Begin
if (RuleStat(51)>0  and  RuleStat(127)>0  and  RuleStat(278)>0)
then
if IMUL__FileCreated('c:\Program Files\GoodEXE\settings.ini')
        then
    AddSR(-100);
end.
```

In this example, IMUL_FileCreated is a function which checks the completed operations to be executed by the application during emulation, and the creation of a file with the name "settings.ini" in the catalog c:\Program Files\GoodEXE\ enables the behavior of the application to be recognized as legitimate, allowing security rating to be reduced to zero.

A further example will now be given. Table 2 below shows statistics on the operation of rules in the analysis of malicious and safe file objects:

| Type/ MD5 ID | Statistics | Rule #51 | Rule #127 | Rule #214 | Rule #278 |
|---|---|---|---|---|---|
| malicious MD5 ID1 | 5 | + | + | | + |
| malicious MD5 ID2 | 19 | + | + | | + |
| malicious MD5 ID3 | 150 | + | + | | + |
| Safe MD5 ID4 | 140 | + | + | | + |
| Safe MD5 ID5 | 90 | + | + | | + |
| Safe MD5 ID6 | 55 | + | + | | + |

Evidently, in this case the same rules operate for both malicious and safe programs, and it may be difficult to create a behavior model script that would allows distinguishing programs according to their combined behavior (i.e. according to a number of rules). For this purpose, in one aspect, the system may identify a number of clarifying characteristics (e.g., system events) of the operation of the malicious or safe program. Examples of these clarifying characteristics include, but not limited to; creating a file; downloading a file; writing to a file; detecting malicious behavior; exchanging data on a network. Let us assume that safe programs shown in Table 2 create the file install_log.txt on the hard disk drive, whereas malicious programs do not. Accordingly, the behavior model script may be written as follows:

```
Begin
  if (RuleStat(51)>0 and RuleStat(127)>0 and RuleStat(278)>0) then
    if IMUL_FileCreated('install_log.txt') then
      AddSR(-100);
  end.
```

In some cases, the addition of further conditions (i.e., clarifying characteristics) to the behavior model script can be dispensed with. This is possible if the statistics on the activation of rules are known and if these statistics unambiguously distinguish the behavior of a malicious program from the behavior of a safe program. For example:

| Type/ MD5 ID | Statistics | Rule #51 | Rule #127 | Rule #214 | Rule #278 |
|---|---|---|---|---|---|
| malicious MD5 ID1 | 5 | 7 | 7 | | 6 |
| malicious MD5 ID2 | 19 | 9 | 7 | | 7 |
| malicious MD5 ID3 | 150 | 8 | 3 | | 7 |
| Safe MD5 ID4 | 140 | 2 | 5 | | 6 |
| Safe MD5 ID5 | 90 | 1 | 7 | | 7 |
| Safe MD5 ID6 | 55 | 3 | 3 | | 6 |

The values in the rule columns show the number of activations of each rule during the analysis of the particular file. Evidently, the statistics for rules 127 and 278 do not differ for safe and malicious programs, whereas for rule 51 they show a clear pattern, in that the rule is activated 7-9 times for malicious programs, and 1-3 times for safe ones. In this case, the following script can be automatically generated by the antivirus system:

```
Begin
  if (RuleStat(51)>=7 and RuleStat(127)>0 and RuleStat(278)>0) then
    AddSR(-100);
end.
```

In one example embodiment, the events which were recorded in an emulator (or during execution on a real computer system) may be described in the form of a supplementary rule, for example as follows:

| Type/ MD5 ID | Statistics | Rule #51 | Rule #127 | Rule #214 | Rule #278 | Rule #2102 |
|---|---|---|---|---|---|---|
| malicious MD5 ID1 | 5 | + | + | | + | |
| malicious MD5 ID2 | 19 | + | + | | + | |
| malicious MD5 ID3 | 150 | + | + | | + | |
| Safe MD5 ID4 | 140 | + | + | | + | + |
| Safe MD5 ID5 | 90 | + | + | | + | + |
| Safe MD5 ID6 | 55 | + | + | | + | + |

Evidently, another rule (rule no. 2102) has been added, this rule records the creation of the install_log.txt file and reduces the security rating on the activation of this rule, thus enabling false positives to be avoided.

It should be noted that rules similar to rule 2102 may have clarifying characteristics, such as, for example, the location of the file on the disk, the file extension, the file name, and the like. The clarifying characteristics may be stored in various parameters (properties) of objects which are used when an API function is called, such as files, registry branches, network connections, processes, services and the like. These parameters of objects are also called metadata. Standardization, in the form of the use of different masks, for the file name or its location on the disk for example, can also be used as one of the clarifying characteristics.

An example of the use of clarifying characteristics:

```
begin
  if copy(ExtractFilePath(APIArg[1]), 2, 100)=':\' then begin
    AddSR(20);
    if (ExtractFileExt(APIArg[1]) = '.exe' then AddSR(40);
    if (ExtractFileExt(APIArg[1]) = '.com' then AddSR(50);
    if (ExtractFileExt(APIArg[1]) = '.pif' then AddSR(60);
  end;
end
```

In this case, the clarifying characteristic is the file creation operation; a check is made to ascertain that the file is created in the root of the disk, and 20 security rating units are then added. The limitation is then carried out, with the addition of a further rating according to the file extension. The function APIArg enables the script to address the arguments of the call which is to be evaluated (in this case, a file creation operation), while AddSR enables a specific value to be added to the total security rating.

Figure 2:
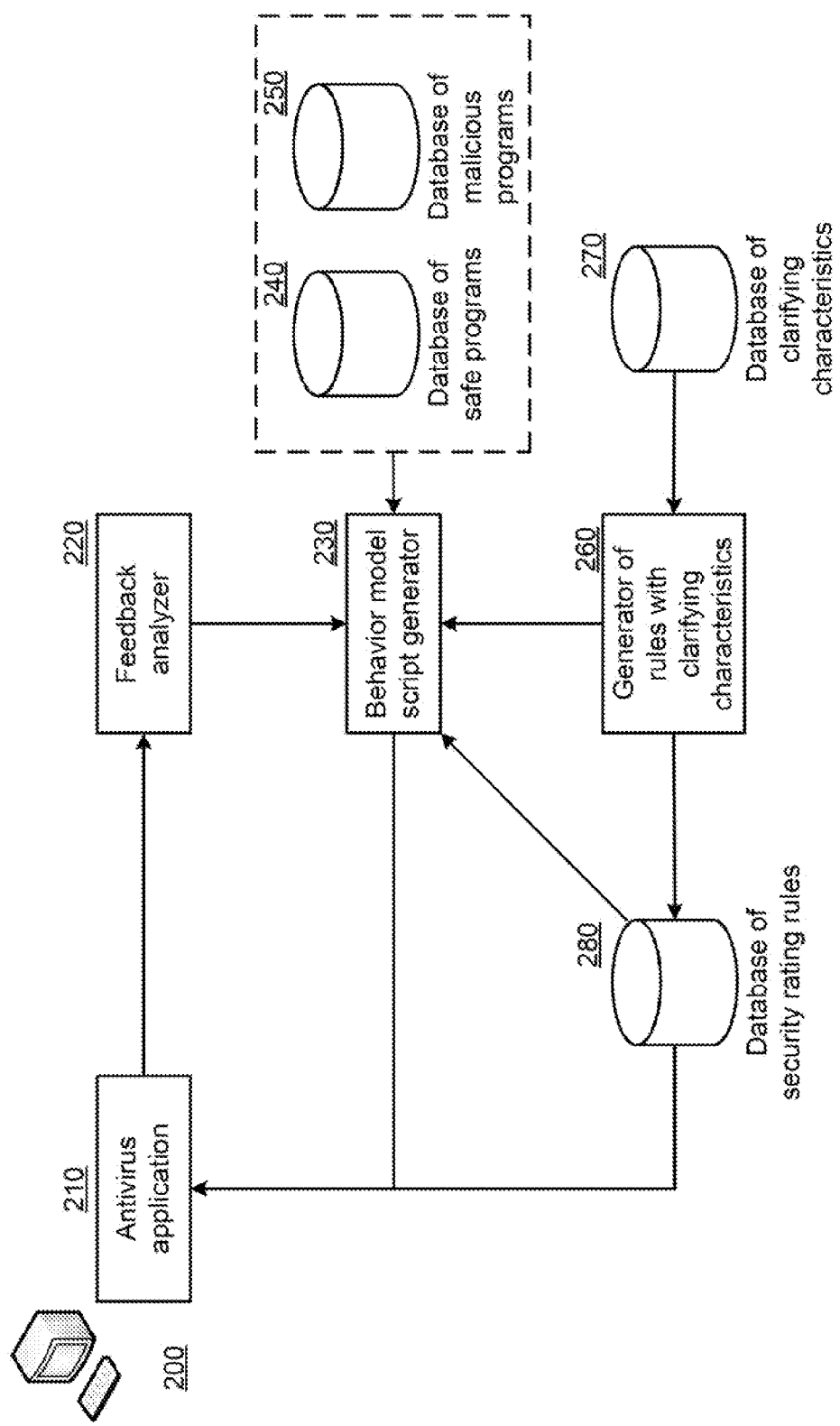
FIG. 2 illustrates an example embodiment of an antivirus system for detection of malware using behavior model scripts of security rating rules.

FIG. 2 shows an example embodiment of the antivirus system for detection of malware using behavior model scripts of security rating rules. The system may be deployed on a user's computer 200 or remote antivirus server (not shown). As shown, the behavior model script generator 230 uses a database of safe programs 240 and a database of malicious programs 250 in order to identify problematic rules from the security rating rules database 280 and create behavior model scripts using algorithms shown in FIG. 1. If a problematic rule cannot be eliminated without using clarifying characteristics, the behavior model script generator 230 enables a generator of rules with clarifying characteristics 260, which uses a clarifying characteristics database 270. In one example embodiment, the generator of rules with clarifying characteristics 260 not only supplements the behavior model script, but also formulates a new security rating rule in the security rating rules database 280. This rule, together with the behavior model scripts that have been created, is sent to the antivirus application 210, which has been installed on the user's computer 200. During the activation of the behavior model scripts, a feedback is created, this being done, for example, manually if the user detects a false positive during the operation of the behavior model scripts, or automatically, if one of the behavior model scripts outputs erroneous information when known malicious or safe programs are detected (a script of this type may be present if a certain amount of time has elapsed after the creation of the behavior model script, during which the safe program database 240 and the malicious programs database 250 have been updated). The feedback is taken into account with the aid of a feedback analyzer 220, which records all cases of false positives or false negatives (e.g., errors of both the first and the second type) and sends this information to the behavior model script generator 230. An example of the correction of false positives is provided in the commonly assigned U.S. Pat. No. 7,640,589, which is incorporated by reference herein. In a number of cases, a malware expert may be consulted to make changes in the behavior model scripts that have been created.

Figure 3:
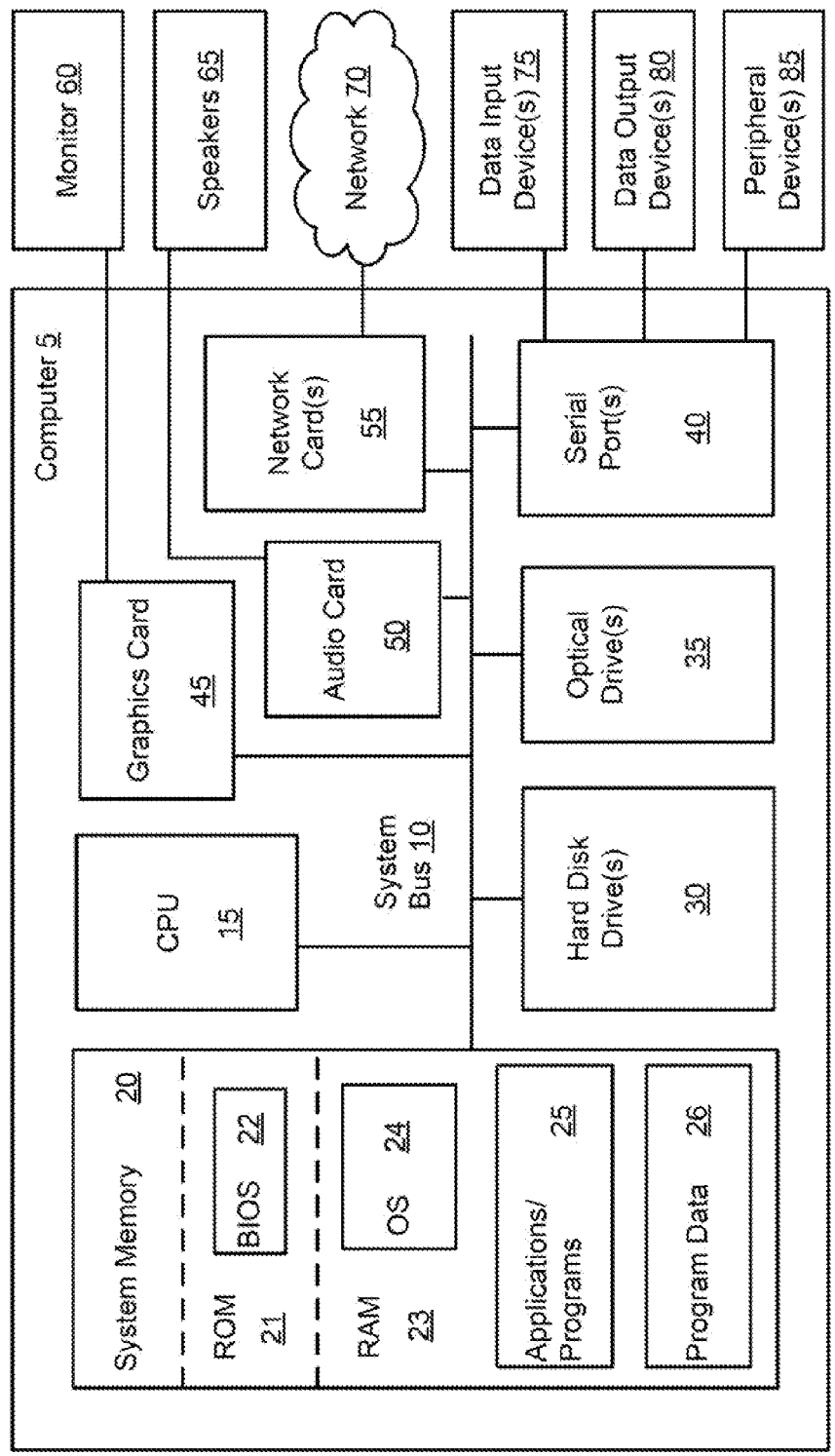
FIG. 3 illustrates an example embodiment of a general-purpose computer in which the systems and methods for detection of malware using behavior model script of security rating rules can be implemented.

FIG. 3 depicts one example embodiment of a computer system 5 that could be used to implement the systems and methods for detection of malware using behavior model scripts of security rating rules disclosed above with reference to FIGS. 1-2. The computer system 5 may include, but not limited to, a personal computer, a notebook, tablet computer, a smart phone, a network server, a router, or other type of data processing device. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various embodiments, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a computer.

In the interest of clarity, not all of the routine features of the embodiments are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

The invention claimed is:

1. A method for detection of computer malware during antivirus analysis using security rating rules that assign security ratings to the analyzed programs, the method comprising:
identifying at least one problematic security rating rule that was activated during the antivirus analysis of one or more safe programs and one or more malicious programs;
selecting a group of programs for which said problematic security rating rule activated;
identifying in the selected group of programs a plurality of only malicious programs or the plurality of only safe programs based on the activation of the problematic security rating rule and based on activation or non-activation of at least one different security rating rule;
generating, by a computer processor, a behavior model script, based on the problematic security rating rule and the at least one different security rating rule; and
executing said behavior model script during antivirus analysis of said an analyzed program to detect a computer malware in said analyzed program.

2. The method of claim 1, wherein selecting a group of programs for which said problematic security rating rule activated includes: identifying from the selected group of programs one or more clarifying characteristics of only malicious programs or one or more clarifying characteristics of only safe programs.

3. The method of claim 2 further comprising: including the one or more identified clarifying characteristics to the generated behavior model script to allow detection of a malicious program or a safe program during antivirus analysis.

4. The method of claim 2, wherein the one or more clarifying characteristics include: one or more API function calls performed by said safe or malicious program, and one or more parameters of said performed API function calls.

5. The method of claim 2, wherein the one or more clarifying characteristics include: creation of a certain file, download of a certain file, and location of a certain file.

6. The method of claim 1, wherein generating a behavior model script includes: generating a behavior model script that decreases an assigned security rating of the analyzed program below a maliciousness threshold when both the problematic security rating rule and the at least one different security rating rule are activated during antivirus analysis of the program.

7. The method of claim 1, wherein generating a behavior model script includes: generating a behavior model script that increases an assigned security rating of the analyzed program above a maliciousness threshold when the problematic security rating rule is activated and the at least one different security rating rule is not activated during antivirus analysis of the program.

8. A system for detection of computer malware during antivirus analysis using security rating rules that assign security ratings to analyzed programs, the system comprising:
a hardware processor configured to:
identify at least one problematic security rating rule that was activated during the antivirus analysis of one or more safe programs and one or more malicious programs;
select a group of programs for which said problematic security rating rule activated;
identify in the selected group of programs a plurality of only malicious programs or the plurality of only safe programs based on the activation of the problematic security rating rule and based on activation or non-activation of at least one different security rating rule;
generate a behavior model script, based on the problematic security rating rule and the at least one different security rating rule; and
execute said behavior model script during antivirus analysis of said an analyzed program to detect a computer malware in said analyzed program.

9. The system of claim 8, wherein to select a group of programs for which said problematic security rating rule activated, the processor further configured to identify from the selected group of programs one or more clarifying characteristics of only malicious programs or one or more clarifying characteristics of only safe programs.

10. The system of claim 8, wherein the processor further configured to include the one or more identified clarifying characteristics to the generated behavior model script to allow detection of a malicious program or a safe program during antivirus analysis.

11. The system of claim 10, wherein the one or more clarifying characteristics include: one or more API function calls performed by said safe or malicious program, and one or more parameters of said performed API function calls.

12. The system of claim 10, wherein the one or more clarifying characteristics include: creation of a certain file, download of a certain file, and location of a certain file.

13. The system of claim 8, wherein to generate a behavior model script, the processor further configured to generating a behavior model script that decreases an assigned security rating of the analyzed program below a maliciousness threshold when both the problematic security rating rule and the at least one different security rating rule are activated during antivirus analysis of the program.

14. The system of claim 8, wherein to generate a behavior model script, the processor further configured to generate a behavior model script that increases an assigned security rating of the analyzed program above a maliciousness threshold when the problematic security rating rule is activated and the at least one different security rating rule is not activated during antivirus analysis of the program.

15. A computer program product embedded in a non-transitory computer-readable storage medium, the computer program product comprising computer-executable instructions for detection of computer malware during antivirus analysis using security rating rules that assign security ratings to analyzed programs, including instructions for:
identifying at least one problematic security rating rule that was activated during the antivirus analysis of one or more safe programs and one or more malicious programs;
selecting a group of programs for which said problematic security rating rule activated;
identifying in the selected group of programs a plurality of only malicious programs or the plurality of only safe programs based on the activation of the problematic security rating rule and based on activation or non-activation of at least one different security rating rule;
generating, by a computer processor, a behavior model script, based on the problematic security rating rule and the at least one different security rating rule; and
executing said behavior model script during antivirus analysis of said an analyzed program to detect a computer malware in said analyzed program.

16. The product of claim 15, wherein instructions for selecting a group of programs for which said problematic security rating rule activated include instructions for:

identifying from the selected group of programs one or more clarifying characteristics of only malicious programs or one or more clarifying characteristics of only safe programs; and including the one or more identified clarifying characteristics to the generated behavior model script to allow detection of a malicious program or a safe program during antivirus analysis.

17. The product of claim 16, wherein the one or more clarifying characteristics include: one or more API function calls performed by said safe or malicious program, and one or more parameters of said performed API function calls.

18. The product of claim 16, wherein the one or more clarifying characteristics include: creation of a certain file, download of a certain file, and location of a certain file.

19. The product of claim 15, wherein instructions for generating a behavior model script include instructions for: generating a behavior model script that decreases the assigned security rating of an analyzed program below a maliciousness threshold when both the problematic security rating rule and the at least one different security rating rule are activated during antivirus analysis of the program.

20. The product of claim 15, wherein instructions for generating a behavior model script include instructions for: generating a behavior model script that increases the assigned security rating of an analyzed program above a maliciousness threshold when the problematic security rating rule is activated and the at least one different security rating rule is not activated during antivirus analysis of the program.

* * * * *